(12) United States Patent  (10) Patent No.: US 7,059,630 B2
Maertens et al.  (45) Date of Patent: Jun. 13, 2006

(54) HEAD SIDE AIRBAG CUSHION FOLD

(75) Inventors: Paul G. Maertens, Highland, MI (US); Jaime F. Perez, Lake Orion, MI (US)

(73) Assignee: TK Holdings, Inc., Greensboro, NC (US)

( * ) Notice: Subject to any disclaimer, the term of this patent is extended or adjusted under 35 U.S.C. 154(b) by 61 days.

(21) Appl. No.: 10/816,443

(22) Filed: Mar. 31, 2004

(65) Prior Publication Data

US 2005/0218639 A1 Oct. 6, 2005

(51) Int. Cl.
*B60R 21/22* (2006.01)
(52) U.S. Cl. .................................. 280/730.2
(58) Field of Classification Search ............ 280/730.2, 280/730.1, 743.1, 728.1
See application file for complete search history.

(56) References Cited

U.S. PATENT DOCUMENTS

| 4,286,954 A | 9/1981 | McArthur et al. ........... 493/244 |
| 5,348,341 A | 9/1994 | Webber ....................... 280/728 |
| 5,364,126 A | 11/1994 | Kuretake et al. ............. 280/730 |
| 5,378,019 A | 1/1995 | Smith et al. ................. 280/743 |
| 5,382,048 A | 1/1995 | Paxton et al. ................ 280/728 |
| 5,478,113 A | 12/1995 | Rogers ...................... 280/743.1 |
| 5,492,367 A | 2/1996 | Albright et al. ........... 280/743.1 |
| 5,496,056 A | 3/1996 | Dyer ........................ 280/728.1 |
| 5,570,900 A | 11/1996 | Brown ........................ 280/729 |
| 5,667,243 A | 9/1997 | Fisher et al. ............. 280/730.2 |
| 5,730,463 A | 3/1998 | Fisher et al. ............. 280/743.1 |
| 5,752,714 A | 5/1998 | Pripps et al. ............. 280/730.2 |
| 5,765,863 A | 6/1998 | Storey et al. ................ 280/729 |
| 5,785,350 A | 7/1998 | Inoue et al. .............. 280/743.2 |
| 5,791,685 A | 8/1998 | Lachat et al. ............ 280/728.1 |
| 5,823,567 A | 10/1998 | Behr et al. ............... 280/743.1 |
| 5,899,490 A | 5/1999 | Wipasuramonton et al. ..... 280/730.2 |
| 5,944,346 A | 8/1999 | Lachat et al. ............ 280/743.1 |
| 6,213,500 B1 | 4/2001 | Jost et al. ................ 280/730.2 |
| 6,224,092 B1 | 5/2001 | Sakamoto et al. ........ 280/730.2 |
| 6,237,943 B1 * | 5/2001 | Brown et al. ............ 280/730.2 |
| 6,343,811 B1 | 2/2002 | Hammer et al. ......... 280/730.2 |
| 6,361,068 B1 | 3/2002 | Stein et al. .............. 280/730.2 |
| 6,758,490 B1 * | 7/2004 | Hoeft et al. ............. 280/730.2 |

FOREIGN PATENT DOCUMENTS

| DE | 10120354 | 11/2002 |
| JP | 2001354097 A | 12/2001 |
| JP | 2002-193064 A | 7/2002 |

\* cited by examiner

*Primary Examiner*—Faye M. Fleming
(74) *Attorney, Agent, or Firm*—Foley & Lardner LLP

(57) ABSTRACT

A method of folding an airbag 10, and more particularly, a side curtain airbag whereby the airbag is folded to facilitate a relatively more rapid deployment given that the folds as described create a thrusting motion of the airbag out and over the B-pillar and the adjustable turning loop.

6 Claims, 3 Drawing Sheets

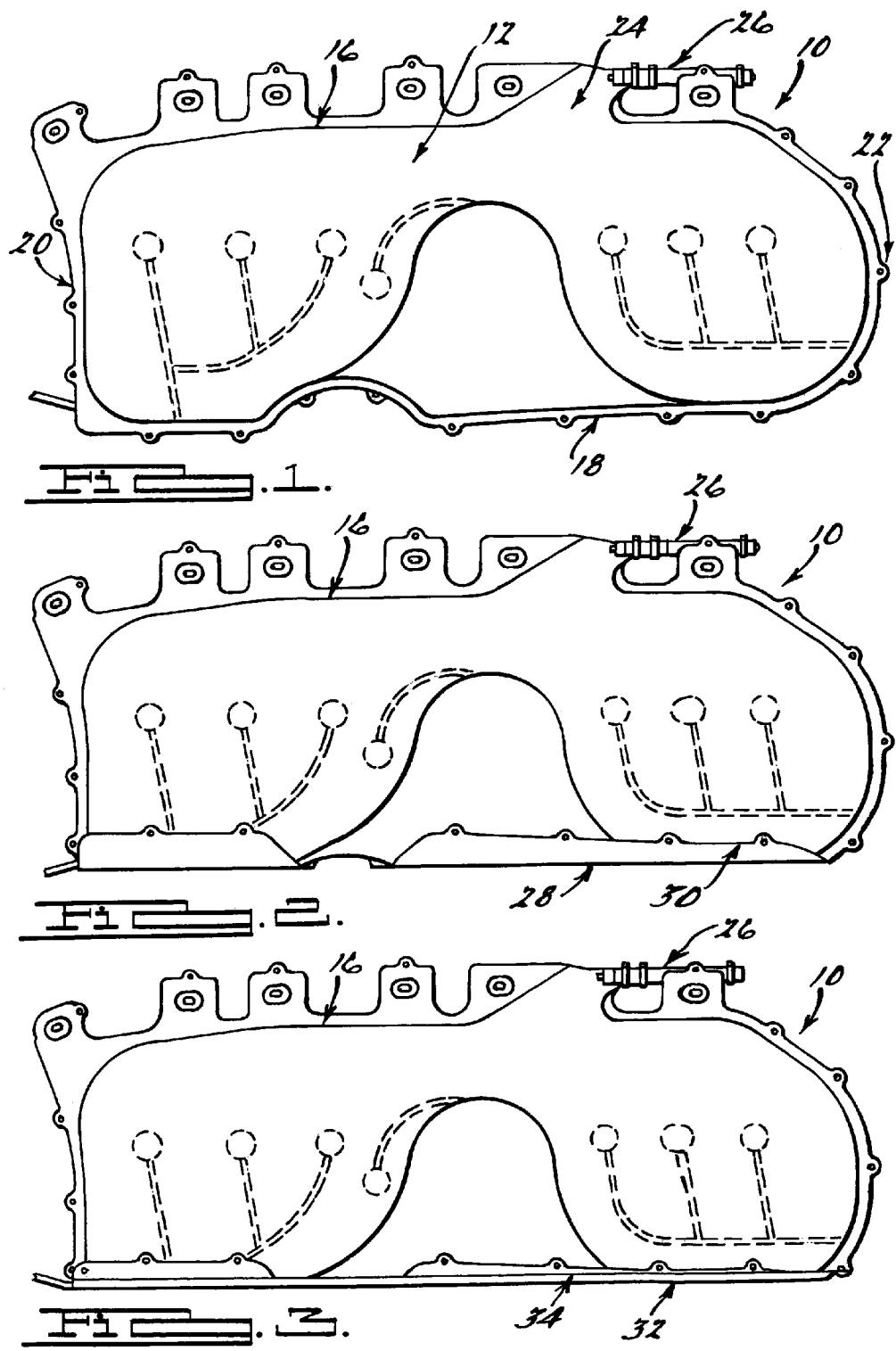

HEAD SIDE AIRBAG CUSHION FOLD

FIELD OF THE INVENTION

The invention relates to vehicle occupant protection systems incorporating airbags and specifically, to an improved method of folding a head side curtain airbag and an airbag module assembly containing an airbag directed to that improved fold.

BACKGROUND

When assembling and packaging an airbag module, it is an ongoing challenge to fit an associated airbag within a given module, tailored to the design specifications of the interior of a given vehicle. Care must be taken when folding the airbag with regard to the folded volume and girth of the airbag and with regard to the natural deployment of the airbag.

Additionally, certain areas of the vehicle require special considerations with regard to vehicle structure associated therewith. For example, the head side airbag in certain vehicles must deploy through the headliner and past the side trim mold. Furthermore, again for certain vehicles, the side curtain airbag must further travel inwardly toward a center axis of the vehicle and then over the B-pillar of the respective side of the vehicle. Accordingly, an ongoing challenge is to fold the airbag not only with regard to ease and rapidity of deployment, but also with regard to the adjacent vehicle structure upon airbag deployment.

SUMMARY OF THE INVENTION

The present invention may be characterized as a method of folding an airbag, particularly a head side airbag, in a series of steps designed to obviate the above-referenced concerns. The airbag comprises a front panel or portion and a back panel or portion that is essentially a mirror image of the front portion, whereby the front and back portions are joined together to form an airbag. Initially, the airbag is preferably placed on a flat surface and the front panel or portion is oriented to face upward from the flat surface. Accordingly, the airbag periphery is defined by a top longitudinal edge, an opposing bottom longitudinal edge, a first side edge, and an opposing second side edge.

A bottom longitudinal edge of an elongated airbag is first preferably rolled upwardly toward a top longitudinal edge about one-eighth to one-tenth of the width of the airbag thereby creating a first bottom folded edge. A first folded portion is also thereby created whereby the first folded portion approximates about one eighth to one-tenth of the total width of the airbag, or one/eighth to one/tenth of the distance from the bottom longitudinal edge to the top longitudinal edge. The first bottom folded edge is then rolled upward toward the top longitudinal edge about one/fifth to one/half of the width of the first folded portion thereby creating a first folded roll. The first folded roll is then laterally rolled a plurality of times in preferably substantially even folds, to leave an unfolded top portion of the airbag measured to be about one/sixth to one/eighth of the total width of the airbag. These steps thereby resulting in a first plurality of rolls having substantially a first roll width.

Next, the bottom panel or portion is oriented to face upward from the flat or folding surface whereby the first plurality of rolls is faced downward and a backside of the first plurality of rolls is now oriented upward from the flat surface. The backside of the first plurality of rolls is then rolled upward toward the top longitudinal edge thereby resulting in at least one roll having a width about half that of the first plurality of rolls. More likely, the backside is rolled upward to the top longitudinal edge thereby resulting in a second plurality of rolls, each roll preferably having a substantial even width about half that of the first plurality of rolls.

Finally, a folded part of the rear portion of the airbag extends from an associated airbag inflator and outwardly to the second side edge. The folded part is folded beneath the airbag inflator to establish a third side edge that is preferably substantially flush with the outermost end of the airbag inflator. The airbag is then enclosed with a cushion sleeve and may be attached to the associated tether in a known manner.

BRIEF DESCRIPTION OF THE DRAWINGS

FIG. 1 is an unfolded preferred airbag of the present invention, wherein the inflator is secured to the airbag with clamps.

FIG. 2 exemplifies a first step in the folding process.
FIG. 3 exemplifies a second step in the folding process.

DETAILED DESCRIPTION OF THE PREFERRED EMBODIMENT(S)

Figure 4:
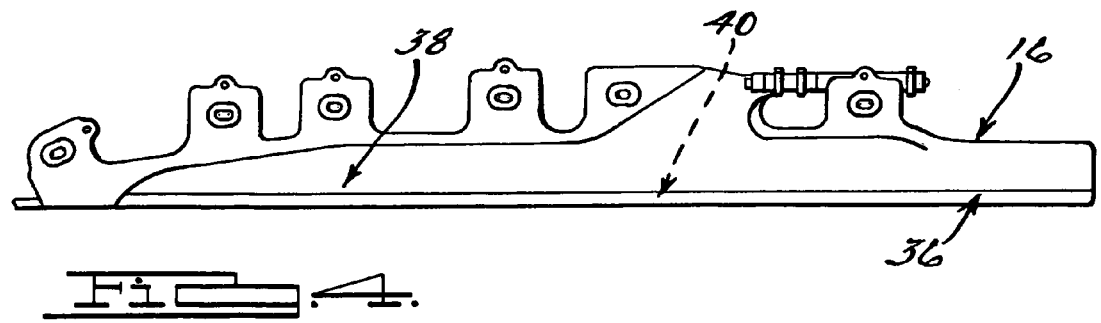
FIG. 4 exemplifies a third step in the folding process.
Figure 5:
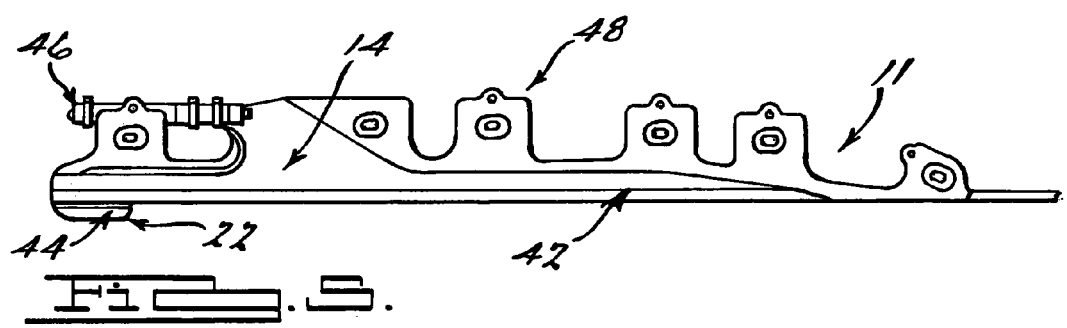
FIG. 5 exemplifies a fourth step in the folding process.
Figure 6:
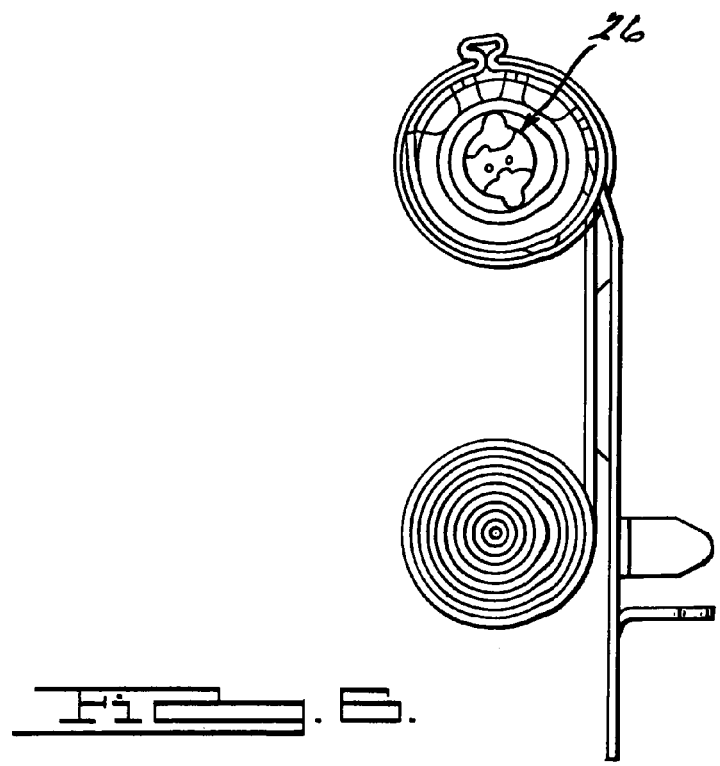
FIG. 6 exemplifies a finished fold of the airbag.
Figure 7:
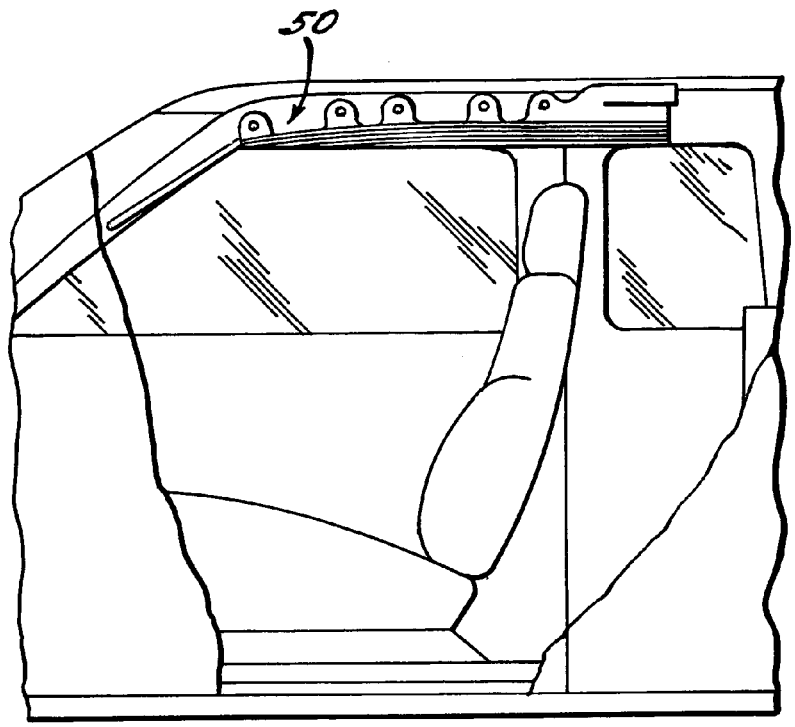
FIG. 7 exemplifies an airbag folded in accordance with the present invention, and trim prior to deployment.
Figure 8:
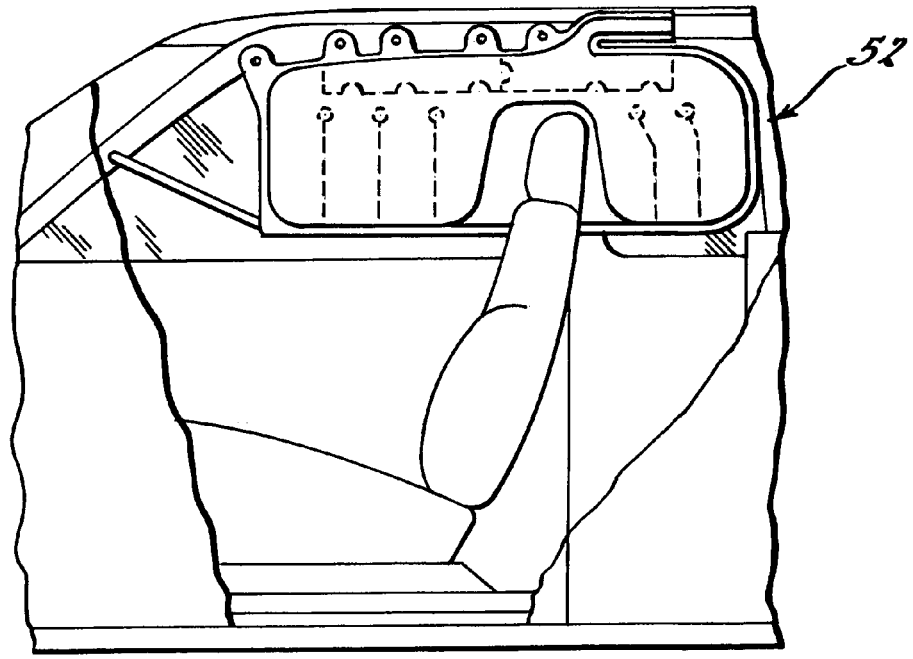
FIG. 8 exemplifies a deployed airbag, wherein the airbag prior to deployment is folded in accordance with the present invention.

As shown in the figures, a preferred construction of an airbag 10 includes a first or front portion 12 and a second or back portion 14 wherein each portion is essentially a mirror image of the other and the first and second portions are joined together to form the airbag 10 as recognized in the art. The airbag 10 contains a top longitudinal edge 16 and a bottom longitudinal edge 18 opposed to the top longitudinal edge 16. The periphery of the airbag 10 is further defined by a first side edge 20 and a second side edge 22 opposed to the first side edge 20. A throat 24 is formed in an upward area of the airbag 10 thereby providing fluid communication between the airbag 10 and an associated inflator 26 upon airbag deployment. The gas exit of the inflator 26 is clamped or otherwise attached to the throat gas inlet 24 of the airbag 10 thereby providing fluid communication between the gas generator 26 and the airbag 10. The airbag 10 is described with certain features for discussion of the operational and descriptive areas of the airbag 10. One of ordinary skill in the art however will appreciate the wide variety of permutations possible relative to the various exemplary design features described above and shown in the drawings. The invention should therefore not be limited or construed narrowed by this description but should rather illustrate and augment the breadth of the appended claims.

Initially, the airbag 10 is preferably laid flat on a folding surface 11 with the longitudinal edges in horizontal orientation. In a first folding step, the bottom longitudinal edge 18 of the elongated airbag 10 is folded upwardly toward the top longitudinal edge 16 thereby creating a first fold 28 and a first folded portion 30 approximately one-eighth to one-tenth of the airbag width. It has been found that this first fold 28 facilitates clearance of the adjustable turning loop (ATL) of the seatbelt by thrusting the airbag 10 out and over the B-pillar, C-pillar, and the ATL.

In a second step, the first fold 28 is again upwardly folded toward the top edge 16 thereby creating a second fold 32 and a second folded portion 34, whereby the second folded portion 34 is approximately one-third to one-fifth of the width of the first folded portion 30, and preferably approximately about one-fourth of the first folded portion 30. It has been discovered that upon airbag activation, this particular second fold facilitates relatively rapid downward unfolding of the airbag 10 over the trim to ensure a timely protective positioning thereof.

Next, the second folded portion 34 of the airbag is rolled a plurality of times, whereby each roll is substantially equivalent in width to the other rolls, thereby resulting in a first plurality of rolls 36 having a first average roll width. The first plurality of rolls 36 extends upwardly toward the top edge 16 while retaining an upper unfolded portion 38 of the airbag 10 about one-eighth to one-fifth of the width of the airbag 10.

Next, the back panel or portion 14 is oriented to face upward, preferably from the flat or folding surface 11 whereby the first plurality of rolls 36 is faced downward and a backside 40 of the first plurality of rolls is therefore also oriented to face upward. The backside 40 is rolled upwardly to the top longitudinal edge 16 whereby each roll is preferably about half the width of the first plurality of rolls 36, thereby creating a second plurality of rolls 42. The second plurality of rolls 42 facilitates the necessary buildup of pressure to break through or rupture the headliner trim formed about the airbag module assembly.

Finally, the second side edge 22, now indicated as a folded edge as defined by the first and second plurality of rolls 36 and 42, is folded beneath the inflator 26, whereby the underfold 44 is preferably flush or almost flush with an outermost portion 46 of the inflator 26. A wrap or cushion sleeve (not shown), or other suitable type of fold retention device, is then placed over the airbag assembly 48 containing the airbag 10 and the inflator 26. The airbag assembly is then installed within an associated airbag module 50, as known in the art.

In yet another aspect of the invention, a vehicle occupant restraint system 52, or the airbag module 50 is equipped with the folded airbag 10 as described above.

It will be understood that the foregoing description of the present invention is for illustrative purposes only, and that the various structural and operational features herein disclosed are susceptible to a number of modifications, none of which departs from the spirit and scope of the present invention.

What is claimed is:

1. A method of folding an airbag comprising a front portion, a back portion joined to the front portion, a throat portion connected to an associated inflator, a first top longitudinal edge, a first bottom longitudinal edge, a first side edge, a second side edge proximate to the inflator, and an airbag width formed between the top and bottom longitudinal edges, the method comprising:

orienting the front portion to face upwardly;

folding the first bottom longitudinal edge toward the first top longitudinal edge wherein a first bottom fold is formed about one-eighth to one-tenth of the total width of the airbag, wherein the first bottom fold forms a second bottom longitudinal edge;

folding the second bottom longitudinal edge toward the first top longitudinal edge wherein a second bottom fold is formed about one-half to one-fifth of the width of the first bottom fold;

folding the second bottom fold toward the first top longitudinal edge thereby forming a first plurality of folds extending to about one-eighth to one-fifth of the width of the airbag from the first top longitudinal edge, wherein the first plurality of folds comprises a backside downwardly oriented;

orienting the back portion of the folded airbag upwardly and the front portion downwardly;

folding the backside of the first plurality of folds to the first top longitudinal edge to form at least one additional roll; and folding the second edge beneath the inflator to form a third fold wherein the third fold is formed beneath the inflator.

2. An airbag module comprising an airbag formed as claimed in claim 1.

3. A vehicle occupant protection system comprising an airbag formed as claimed in claim 1.

4. An airbag folded as claimed in claim 1.

5. The method of claim 1 wherein said airbag is a head side airbag.

6. An airbag device comprising:

a housing;

a gas generator contained within said housing;

an airbag also contained within said housing and in fluid communication with said gas generator, wherein said airbag is folded as claimed in claim 1.

* * * * *